(12) United States Patent
Sridharan et al.

(10) Patent No.: US 9,223,674 B2
(45) Date of Patent: Dec. 29, 2015

(54) COMPUTER SYSTEM AND METHOD FOR RUNTIME CONTROL OF PARALLELISM IN PROGRAM EXECUTION

(71) Applicant: Wisconsin Alumni Research Foundation, Madison, WI (US)

(72) Inventors: Srinath Sridharan, Madison, WI (US); Gurindar Singh Sohi, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 133 days.

(21) Appl. No.: 13/792,846

(22) Filed: Mar. 11, 2013

(65) Prior Publication Data

US 2014/0259024 A1  Sep. 11, 2014

(51) Int. Cl.
*G06F 9/455*   (2006.01)
*G06F 11/34*   (2006.01)
*G06F 9/48*    (2006.01)

(52) U.S. Cl.
CPC ............... *G06F 11/34* (2013.01); *G06F 9/485* (2013.01)

(58) Field of Classification Search
None
See application file for complete search history.

(56) References Cited

U.S. PATENT DOCUMENTS

| | | | | |
|---|---|---|---|---|
| 7,797,512 B1* | 9/2010 | Cheng et al. | | 712/10 |
| 8,752,058 B1* | 6/2014 | Zheng et al. | | 718/102 |
| 2009/0083751 A1* | 3/2009 | Sakai | | 718/105 |
| 2009/0241122 A1* | 9/2009 | Wong | | 718/104 |
| 2009/0307708 A1* | 12/2009 | Archer et al. | | 718/108 |
| 2009/0328047 A1* | 12/2009 | Li et al. | | 718/102 |
| 2010/0070740 A1* | 3/2010 | Allen et al. | | 712/30 |
| 2011/0088022 A1* | 4/2011 | Kruglick | | 717/153 |
| 2011/0231403 A1* | 9/2011 | Oks et al. | | 707/741 |
| 2012/0180062 A1* | 7/2012 | Sohi et al. | | 718/104 |
| 2013/0024871 A1* | 1/2013 | Gao et al. | | 718/105 |
| 2014/0019984 A1* | 1/2014 | Li et al. | | 718/102 |

OTHER PUBLICATIONS

Matthew Curtis-Maury, James Dzierwa, Christos D. Antonopoulos, Dimitrios S. Nikolopoulos; Online Power-Performance Adaptation of Multithreaded Programs using Hardware Event-Based Prediction; Research Article; Jun. 28-30, 2006; ACM 1-59593-282-8/6/0006; ICS06, Cairns, Quennsland, Australia.

Jason Mars, Lingjia Tang, Robert Hundt, Kevin Skadron, Mary Lou Soffa; Bubble-Up: Increasing Utilization in Modern Warehouse Scale Computers via Sensible Co-locations; Research Article; Dec. 3-7, 2011; ACM 978-1-4503-1053-6/11/12; MICRO '11, Porto Alegre, Brazil.

Jian Li, Jose F. Martinez; Dynamic Power-Performance Adaption of Parallel Computation on Chip Multiprocessors; pp. 77-87; IEEE 2006; US.

Andrew Tucker, Anoop Gupta; Process and Scheduling Issues for Multiprogrammed Shared-Memory Multiprocessors; Research Article; 1989 ACM 089791-338-3/89/0012/0159; pp. 159-166; US.

(Continued)

*Primary Examiner* — Dong Kim
(74) *Attorney, Agent, or Firm* — Boyle Fredrickson, S.C.

(57) ABSTRACT

A computer system and method are provided to assess a proper degree of parallelism in executing programs to obtain efficiency objectives, including but not limited to increases in processing speed or reduction in computational resource usage. This assessment of proper degree of parallelism may be used to actively moderate the requests for threads by application processes to control parallelism when those efficiency objectives would be furthered by this control.

22 Claims, 4 Drawing Sheets

(56) References Cited

OTHER PUBLICATIONS

Matthew Curtis-Maury, Ankur Shah, Bronis R. De Supinski, Martin Schulz; Prediction Models for Multi-dimensional Power-Performance Optimization on Many Cores; Oct. 25-29, 2008; pp. 250-259; PACT '08, Toronto, Canada.

Janghaeng Lee, Haicheng Wu, Madhumitha Ravichandran, Nathan Clark; Thread Tailor: Dynamically Weaving Threads Together for Efficient, Adaptive Parallel Applications; Jun. 19-23, 2010; pp. 270-279; ISCA '10; Saint-Malo, France.

M. Aater Suleman, Moinuddin K. Qureshi, Yale N. Patt; Feedback-Driven Threading: Power-Efficient and High-Performance Execution of Multi-threaded Workloads on CMPs; Mar. 1-5, 2008; ASPLOS '08; Seattle, Washington, USA.

Arun Raman; A System for Flexible Parallel Execution; Thesis; Jan. 2012; pp. i-xvii, pp. 1-127; A Dissertation Presented to the Faculty of Princeton University; USA.

Arun Raman, Hanjun Kim, Taewook Oh, Jae W. Lee, David I. August; Parallelism Orchestration using DoPE: the Degree of Parallelism Executive; Jun. 4-8, 2011; PLDI '11; San Jose, California, USA.

Arun Raman, Ayal Zaks, Jae W. Lee David I. August; Parcae: A System for Flexible Parallel Execution; Jun. 11-16, 2012; PLDI '12; Beijing, China.

Thomas E. Anderson, Brian N. Bershad, Edward D. Lazowska, Henry M. Levy; Scheduler Activations: Effective Kernal Support for the User-Level Management of Parallelism; Feb. 1992; pp. 53-79; ACM Transactions on Computer Systems; vol. 10, No. 1; Seattle, Washington, USA.

* cited by examiner

COMPUTER SYSTEM AND METHOD FOR RUNTIME CONTROL OF PARALLELISM IN PROGRAM EXECUTION

STATEMENT REGARDING FEDERALLY SPONSORED RESEARCH OR DEVELOPMENT

This invention was made with government support under 0963737 awarded by the National Science Foundation. The government has certain rights in the invention.

CROSS REFERENCE TO RELATED APPLICATION

N/A

BACKGROUND OF THE INVENTION

The present invention relates generally to computer systems providing execution of programs in parallel on multiple processors and, in particular, to an apparatus and method for controlling the degree of parallel execution to optimize execution speed, the use of computational resources, power or energy consumption or the like.

Employing multiple processors to execute different portions of a program in parallel on different processors has become increasingly important as faster processor speeds become more difficult to obtain. To this end, current microprocessors normally integrate multiple processing cores into the microprocessor integrated circuit in contrast to several years ago when single core microprocessors were the rule.

While the benefit of parallel execution in increasing program execution speed is well known, increased parallelism is not always beneficial. While too little parallelism leaves more room for efficient program execution, too much parallelism can lead to execution inefficiencies actually decreasing program performance. These inefficiencies may result from a variety of sources including, for example, increased contention between different programs caused by increased parallelism, increased processing overhead from implementing increased parallelism, for example, in load balancing or scheduling, and increased energy dissipation causing some processors to be deactivated or experience intermittent faults.

The challenge of determining the correct degree of parallelism (DoP) is not readily addressed by the programmer (that is statically) because of the complexity of the problem, the unknown effects of other concurrently executing programs, and the variability hardware platform and its resources. This latter problem is particularly acute in the current processing environment which is increasingly fragmented between radically different low-end devices (e.g. mobile devices) and high-end devices (e.g. servers). These different classes of device may further individually present heterogeneous processing environments including cores with different energy consumption/performance characteristics, for example, specialized graphic processing cores or other accelerators alongside general purpose processing cores.

SUMMARY

The present invention provides a computer system and method that may assess the optimal degree of parallelism during runtime and control the parallelism according to that assessment. This runtime assessment improves portability of programs among multiple disparate devices where the degree of parallelism may change significantly.

In one embodiment, the invention provides an electronic computer system of the type having multiple processors where one or more of the processors operate so as to:

(a) during a preceding interval of execution of an application program, vary a number of threads employed by an application program while evaluating the application program performance to establish a relationship between number of threads and the application program performance;

(b) during a next succeeding interval of execution, control the number of threads employed by the application program based on the relationship to improve the application program performance; and (c) repeating steps (a) and (b) during execution of the application program at successive preceding and succeeding intervals of execution.

It is thus a feature of at least one embodiment of the invention to ensure neither too much nor too little parallelism in the execution of program based on current runtime conditions. It is a further feature of at least one embodiment of the invention to provide a methodology for determining the proper amount of parallelism through the use of an empirical technique when underlying data may be hidden or unavailable.

The application program performance may be that of instruction execution speed, processor resource usage, processor energy usage or processor power usage, among others.

It is thus a feature of at least one embodiment of the invention to provide a method of determining the right amount of parallelism suitable for application to a wide variety of performance goals including increased speed, cost savings, energy reduction, power reduction or temperature reduction.

The invention may determine when a parallelism region of the application program occurs in which instructions of the application program may be executed in parallel, and step (a) may be timed to occur in the parallelism region of the application program.

It is thus a feature of at least one embodiment of the invention to provide a highly sensitive measurement of the effects of parallelism undiluted by measurements of portions of the program that must be executed serially.

The relationship between performance and parallelism may measure an apparent "artificial serialization" of the application program representing a decrease in application program performance below that possible when instructions of the application program, which may be executed in parallel, are executed in parallel.

It is thus a feature of at least one embodiment of the invention to provide a methodology for determining the right amount of parallelism that may easily embrace a wide variety of causes and effects including but not limited to: (1) demands of other programs that are concurrently executing on the same hardware, (2) intermittency of hardware based on power, thermal, or reliability conditions, (3) processing bottlenecks represented by other hardware resources such as memory, (4) delays associated with cache coherence protocols, (5) overhead represented by parallel execution, (6) the size of the application program, and (7) a particular program performance goal.

The invention may include the step of monitoring a parameter of application program performance and may repeat steps (a) and (b) based on changes in the monitored parameter occurring during the second interval.

It is thus a feature of at least one embodiment of the invention to minimize the overhead of determining the right amount of parallelism by triggering reassessment of the degree of parallelism according to measured quantities that suggest changes in hardware resource availability.

The parameter of application program performance used to trigger reassessment may be selected from the group consisting of: executed instructions per second, processor power, processor energy and processor temperature.

It is thus a feature of at least one embodiment of the invention to provide monitored parameters that can be readily determined by existing or well-understood computer hardware structures.

The invention may be implemented by providing a virtualizing program positioned between the application program and an operating system program, the operating system program allocating N threads to an application program where the threads are independently schedulable on the electronic processors and independently executable on different electronic processors. The virtualizing program may communicate with the application program to provide the application program with M virtual threads and to map a changing subset P of the N threads to the virtual threads M based on the relationship to improve the application program performance.

It is thus a feature of at least one embodiment of the invention to provide a method of controlling parallelism to increase program performance that is not beholden to existing or future operating systems in standalone or cloud computing environments that may not willingly reveal the underlying information needed for optimization of the amount of parallelism or provide for the same goals for optimizing parallelism (e.g., reducing costs).

It is further a feature of at least one embodiment of the invention to provide a method of controlling parallelism to increase program performance that is not beholden to the application program.

The virtualizer program may vary a mapping of the P threads to all of the M virtual threads by activating and suspending the M virtual threads over time to guarantee forward progress.

It is thus a feature of at least one embodiment of the invention to prevent starvation of any thread of the application program by a virtualizing program despite a limiting of threads to less than that requested.

The electronic computer system may provide for a call stack associated with each of the M virtual threads allowing activating and suspending of a virtual thread.

It is thus a feature of at least one embodiment of the invention to allow the suspension and reactivation of program portions by a program other than the operating system.

These particular objects and advantages may apply to only some embodiments falling within the claims and thus do not define the scope of the invention.

DETAILED DESCRIPTION OF THE PREFERRED EMBODIMENT

Figure 1:
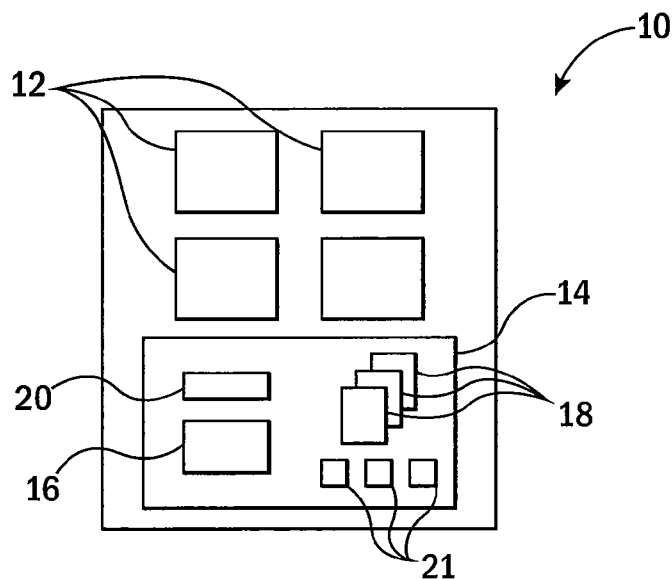
FIG. 1 is a simplified block diagram of a multiprocessor computer system suitable for use with the present invention showing multiple processing cores communicating with a memory holding application programs, an operating system program, a virtualizer program, and various data structures to be described below.

Referring now to FIG. 1 a computer system 10 may provide for multiple processing cores 12, for example, each containing a processing unit for executing arithmetic, logical, and dataflow instructions, registers, caches and the like.

The processing cores 12 may communicate with a memory 14 logically shown as a single entity but typically comprised of various memory devices including random access memory, disk drive, flash drive, and the like.

The memory 14 may hold an operating system program 16 of the type generally known in the art as well as multiple application programs 18 whose execution will be managed by the operating system program 16. Memory 14 may also include a virtualizer program 20 of the present invention and various data structures 21 used by the application programs 18, the operating system program 16, and the virtualizer program 20.

The operating system program 16 is of a type capable of allocating multiple processing threads among the resources of the cores 12 according to a scheduling system. As is generally understood in the art, threads represent portions of application programs (e.g. sets of instructions) that may be substantially scheduled separately and executed independently on a different core 12. Operating system programs suitable for use with the present invention include the current Windows operating system commercially available from Microsoft and various versions of the Linux operating system freely available from a variety of sources.

The invention is not limited to this depicted architecture which is provided only by way of example but may work generally with any computer system capable of parallel processing in which one or more threads of a given application program 18 are simultaneously executed on different cores 12.

Figure 2:
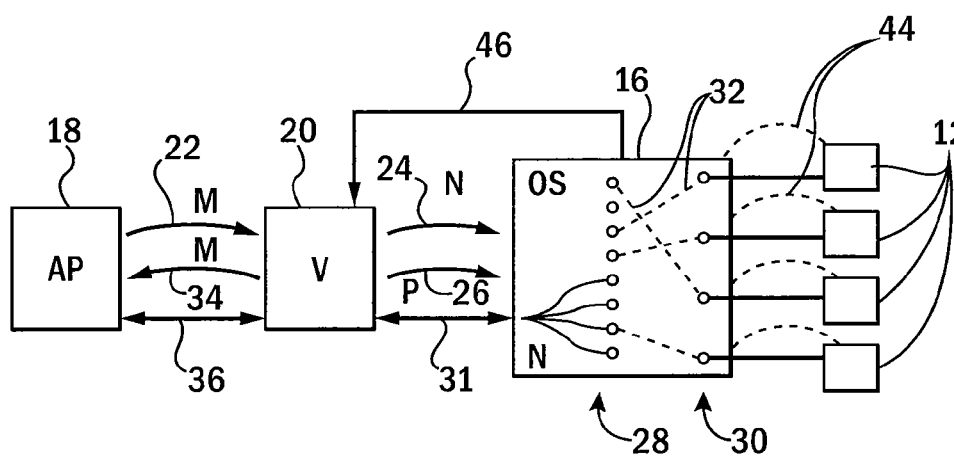
FIG. 2 is a logical data flow diagram of the embodiment of FIG. 1 showing interposition of the virtualizer program between the application program and operating system with respect to the process of allocating threads.

Referring now to FIG. 2, before or during execution, an application program 18 may indicate an ability to use a given number of threads M in one or more logical requests 22 normally directed to the operating system program 16. The requests 22 may be implemented in a variety of forms including system calls, register settings and the like and are presented in the form of request 22 for clarity only. Generally the operating system program allocates a requested number of threads M which stays relatively constant during execution of the parallel region in the application program 18. Typically, the request 22 results from a programmer's static division of the application program 18 into a number of independently executable portions associated with thread creation or thread barrier commands or the like. This partitioning of the program may be made at the time of program preparation and before execution of the application program 18 on the computer system 10.

This request 22 may be intercepted by the virtualizer program 20 which allocates to the application program M virtual threads responding with confirmation 34 and forwards a request 24 for actual threads 28 to the operating system 16. Normally, the virtualizer program 20 has access to a system variable N indicating the maximum number of threads possible and will limit its request 22 to that maximum number or this may be enforced by the operating system program 16 when it returns N actual threads.

Generally the operating system program 16 provides the N actual threads to the application program 18 from a store of allocatable actual threads 28 which may be also allocated to other application programs 18 (not shown).

The virtualizer program 20 then selects a $P_{optimum}$ subset threads 28' of these N actual threads 28 that will be mapped to the M virtual threads where $P_{optimum}$ is selected to improve the execution performance of the application program 18 according to a number of factors including a user selectable objective functions. Different example objective functions may seek to increase execution speed, reduce execution cost or resources, or reduce power or energy usage as will be discussed further below. The virtualizer program then activates the selected $P_{optimum}$ subset threads of N and suspends the rest if any by sending activation and suspension requests 26 to the operating system 16 to schedule or remove from scheduling some of the allocated N threads, which nevertheless remain allocated to the virtualizer program 20.

The store of actual threads 28 available from the operating system program 16 will generally exceed the actual resources 30 necessary for thread execution (i.e., the cores 12) and, accordingly, the operating system program 16 will employ a scheduling process providing a time-varying mapping 32 between the allocatable actual threads 28 and actual resources 30 providing a sharing of the actual resources 30 by the allocatable actual threads 28 according to any of the number of scheduling systems understood in the art.

This process results in $P_{optimum}$ subset threads 28' of the N threads made available to the virtualizer program 20 being used at any given time as indicated generally by a logical data flow path 31 in which data and instructions may be exchanged. The virtualizer program 20 may then provide a time varying mapping of the $P_{optimum}$ subset threads 28' to the M virtual threads 40 as indicated generally by logical data flow path 36, also providing for the exchange of data and instructions necessary for program execution.

Referring still to FIG. 2, the processor cores 12 and/or other associated hardware may also communicate, as indicated by data channels 44, with the operating system program 16 to provide data (such as the values of registers and counters or timers) that can be used to deduce operating information such as the number of instructions executed per second, temperature of a core 12, page fault information, average running power, and the like. Some of this information may be communicated to the virtualizer program 20 as indicated by data channel 46 allowing the virtualizer program 20 to establish performance parameters directly as will be discussed below. Nevertheless, direct monitoring of the execution of hardware, such as the cores 12, by the virtualizer program 20 is not required although it can be used if available.

Figure 3:
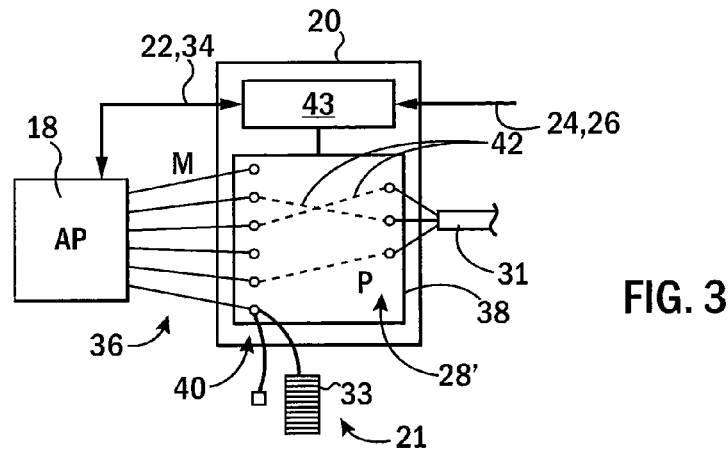
FIG. 3 is a fragmentary detail of the virtualizer program and the application program showing communication paths of a heuristic element of the virtualizer program and thread management portion of the virtualizer, the latter creating virtual threads including data structures necessary for management of the virtual threads.

Referring now to FIGS. 2 and 3, the virtualizer program 20 may provide a thread management section 38 that effectively maps the $P_{optimum}$ subset threads 28' of the N threads provided by the operating system program 16 to the M virtual threads 40 allocated to the virtualizer program 20. Like the operating system program 16, in this regard, the virtualizer program 20 may implement a time-varying mapping 42 between the $P_{optimal}$ subset threads 28' and the M virtual threads 40 according to a scheduling system similar to that provided by the operating system program 16. To this end, each virtual thread 40 is associated with a data structure 21 including, for example, a call stack 33 allowing state variables for the given virtual threads 40 to be stored when the virtual thread 40 is suspended between connections to $P_{optimum}$ subset threads 28'. Generally, this call stack 33 may allow storage of a program counter value, the contents of various general-purpose registers, and a stack pointer to the call stack itself, each data element being of a type generally understood in the art that allows interruption of the process of the threads 40 without loss of data or program state.

Figure 7:
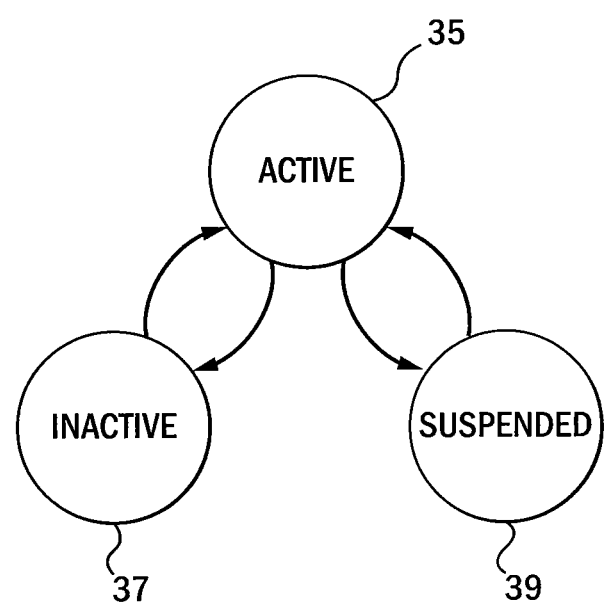
FIG. 7 is a state diagram showing states of each virtual thread managed by the virtualizer and state transition conditions.

Referring momentarily to FIG. 7, to further assist in this time-varying mapping 42, the data structure 21 associated with each virtual thread 40 may also track a status of each virtual thread 40 as being in an active state 35 (indicating that the virtual thread 40 is connected to a $P_{optimum}$ subset thread 28'), an inactive state 37 (indicating that the virtual thread 40 has completed and the application program 18 does not need the resources of that virtual thread 40), and a suspended state 39 (indicating that the application program 18 still requires the resources of the virtual thread 40 but that the virtualizer program 20 has temporarily suspended operation of that thread 40 in favor of a different thread 40). The transition between these states will be described in more detail below.

In addition to the thread management section 38 discussed above, the virtualizer program 20 also provides a heuristic section 43 that receives the initial request 22 of M threads from the application program 18 and determines the value of $P_{optimum}$ and activates only $P_{optimum}$ subset threads of N while suspending the rest if any by sending activation and suspension requests 26 to the operating system 16 to schedule or remove from scheduling some of the allocated N threads, which nevertheless remain allocated to the virtualizer program 20. The heuristic section 43 controls the thread management section 38 to set the number P of subset threads 28' at any time and in this manner may vary that number of subset threads 28' (unsuspended actual threads 28) in a series of tests intended to determine an ideal degree of parallelism ($P_{optimum}$) as will now be described. It should be understood that during these tests, the number P of subset threads 28' will vary from $P_{optimum}$.

Figure 4:
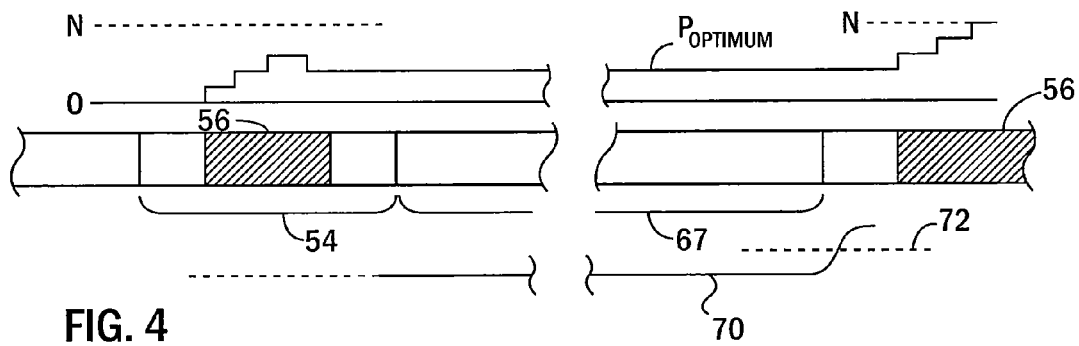
FIG. 4 is a timeline depicting execution of an application program showing a measurement interval when a desired degree of parallelism is determined and an execution interval when that degree of parallelism is enforced, and further showing a monitored parameter used for triggering a new measurement interval and a time variation of thread number during the measurement interval.
Figure 6:
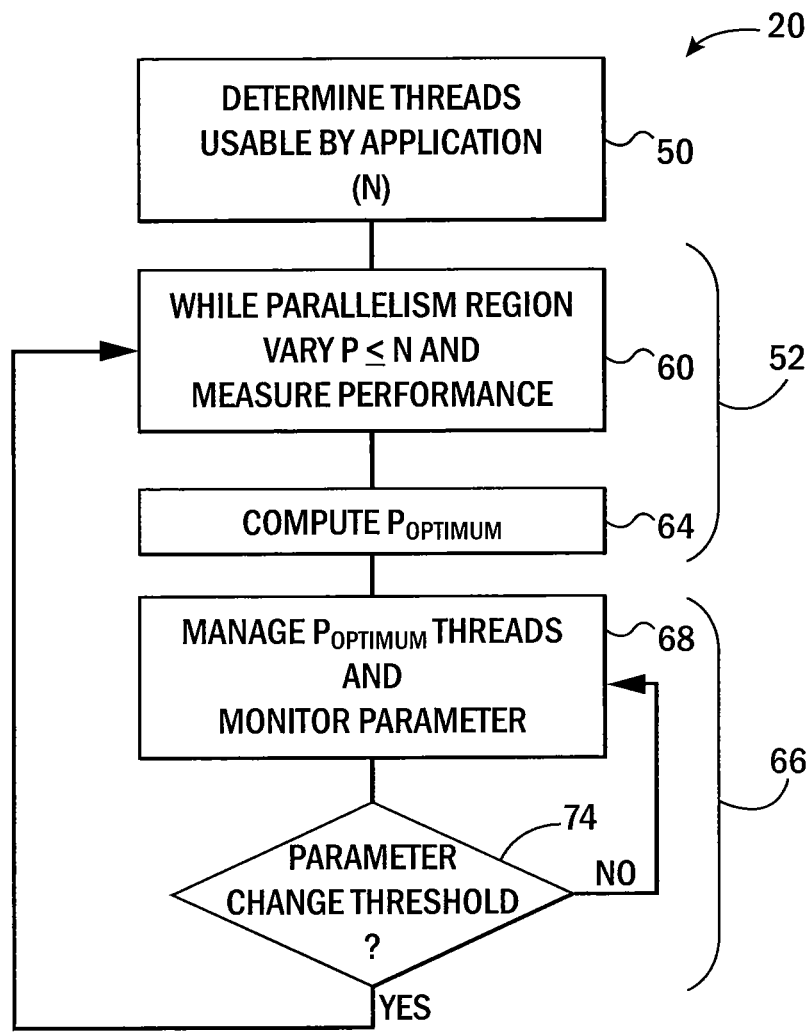
FIG. 6 is a flowchart of the principal steps executed by the present invention in determining a proper degree of parallelism and enforcing that determination.

Referring now to FIGS. 3, 4 and 6, as indicated by process block 50 of FIG. 6, in a first step of execution of the application program 18, the heuristic section 43 may determine the number of threads (M) currently usable by the application program 18 by intercepting the information of request 22 from the application program 18. The virtualizer program 20 then enters a first phase 52 that defines a measurement interval 54 shown in FIG. 4. During this measurement interval 54, the virtualizer program 20 determines whether the application program 18 is in a parallelism region 56 in which more than one virtual thread 40 is active (e.g. $M_{active} > 1$).

While the application program 18 is in the parallelism region 56 during the measurement interval 54, as indicated by process block 60 of FIG. 6, the heuristic section 43 may vary the number of subset threads 28' within the range established between 0 and N, for example, starting with a value of P=1, and next selecting a random value between 1 and N or several random values. At each of these different values P subset threads 28', a measurement is made of system performance, for example instruction execution speed as obtained from a calculation based on data from the operating system along data channel 46. As is understood in the art, instruction execution speed may be readily derived by counting a total number of executed instructions obtained from a hardware instruction counter during a given interval obtained from a hardware clock.

Alternatively, the measurement of system performance may be of total resource usage being a product of the number of P subset threads 28' times the execution time for each P subset threads 28'. When detailed information about processor core 12 use is provided by the operating system program 16, this product may be replaced with actual operating time of each core 12.

Alternatively, a measurement of system power consumption or its proxy in the form of temperature of the integrated circuits may be made or, for server applications, server requests per second may be used. Combinations of these measurements in different measurements are also contemplated by the present invention such as may indicate desired operation of the computer system 10.

Figure 5:
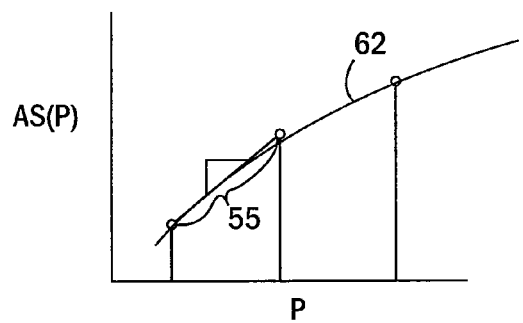
FIG. 5 is a plot of derived artificial serialization versus number of threads showing determination from the measurement interval of quantities that may be used to deduce a desired degree of parallelism.

Referring now to FIG. 5, in the case of measurement and optimization of instruction execution speed, or in the case of measurement and optimization of total resource usage, the measurement interval 54 can be used to assess an apparent "artificial serialization" (AS) of the application program 18 reflecting the difference between a theoretical speed increase obtained by parallel execution with P subset threads 28' and an actual speed increase obtained with the P subset threads 28'. Underlying this artificial serialization can be any of a number of factors including: (1) demands of other programs that are concurrently executing on the same hardware, (2) intermittency of hardware based on power, thermal, or reliability conditions, (3) processing bottlenecks represented by other hardware resources such as memory, (4) delays associated with cache coherence protocols, (5) overhead represented by parallel execution, and others. The invention does not require actual identification of the source of the artificial serialization or that the phenomenon of the artificial serialization be in fact related to serial execution of the application program (it could be reflected in slow parallel execution caused by any of these factors).

Generally, the measured instruction execution speed at different values of P may be converted to values 55 of AS according to the following equation:

$$AS(P) = \frac{\frac{1}{S_m(P)} - \frac{1}{P}}{1 - \frac{1}{P}}, \text{ if } P > 1 \quad (1)$$

using the Karp-Flatt metric described in A. Karp and H. Flatt, Measuring Parallel Processing Performance, Communication of the ACM, 33 (5): 539-543, (1990). In this equation, $S_m$ is a measure of the speed increase with P threads compared to a sequential execution (P=1) and is practically a fraction having as its numerator executed instructions per second with P subset threads 28' and its denominator executed instructions per second with one subset threads 28'.

From these values, a derivative of artificial serialization is also determined, for example, by determining a slope between any two measurements or by a linear regression 62 when there are multiple measurements at different values of P.

Once AS(P) and $$\frac{dAS(P)}{dP}$$

are determined, an optimum value $P_{optimum}$ providing the number of threads for request 26 to create the optimum degree of parallelism may be determined as indicated by process block 64 of FIG. 6.

For a goal of minimized execution time, the value of $P_{optimum}$ is provided as:

$$P_{optimum} = \sqrt{\frac{1 - AS(P) + \frac{1}{4}}{\frac{dAS(P)}{dP}}} + \frac{1}{2}, \quad (2)$$

where $$\frac{dAS(P)}{dP} > 0$$

Minimization of resource consumption (minimizing the number of threads times the time each thread is used) may be according to the formula:

$$P_{optimum} = \frac{AS(P)}{\frac{dAS(P)}{dP}} + 1, \quad (3)$$

where $$\frac{dAS(P)}{dP} > 0$$

Note that the above formula does not require actually knowing the number of cores 12 in service but uses the number of P subset threads 28' as a proxy for this value.

While these explicit formulations may be preferred, it will be appreciated that other optimization techniques including, for example, hill climbing and proportional/integral/derivative control loops may also be suitable for this purpose in which the optimum value is approached incrementally in each measurement interval 54.

Referring still to FIGS. 2, 4, and 6, the virtualizer program 20 may then proceed to a second phase 66 that defines an execution interval 67 (shown in FIG. 4) where, at process block 68, the application program 18 is executed using the $P_{optimum}$ value of subset threads 28'. This execution interval 67 may be limited to a certain period of time but, in one embodiment, the execution interval 67 may continue until terminated by change in a monitored performance parameter 70 shown in FIG. 4. For example, the monitored performance parameter 70 may be instruction execution speed obtained from the operating system program 16 over data channel 46. Alternatively monitored performance parameter 70 of temperature, power usage, or the like may be contemplated to the extent that they indicate a possible change in the availability of computing resources.

This monitored performance parameter 70 may be compared against a threshold 72, for example, being a fixed percentage change in the monitored performance parameter 70 set to suggest a substantial change in the fundamental resource landscape of the computer system 10.

As represented by decision block 74 of FIG. 6, upon a substantial change in the monitored performance parameter 70, the virtualizer program 20 returns to process block 64 and begins a new measurement interval 54. Otherwise the execution interval 67 may be extended indefinitely.

In another embodiment, the virtualizer program may choose to limit the execution interval and reassess the value of $P_{optimum}$, even if there is not any substantial change in the monitored performance, to escape the problem of local optima.

Referring now to FIG. 7, generally the states of the virtual threads 40 are constantly changing between the active state 35, the suspended state 39, and the inactive state 37. Transitions between the active state 35 and the suspended state 39 may occur according to a timeout value (intended to prevent starvation of any given virtual thread 40 by another virtual thread 40 that does not conclude execution). In addition, transitions from the active state 35 to the suspended state 39 may occur when the actual thread being used by that virtual thread 40 is suspended either due to the change in the value of $P_{optimum}$ or when more suspended or inactive virtual threads 40 are needed to be executed to satisfy a barrier or similar condition. In addition, transitions from the active state 35 to the suspended state 39 may be blocked if the relevant virtual thread 40 in the active state 35 is currently holding a mutex or similar synchronization lock that must be released for other virtual threads 40 to continue or is producing input data for another virtual thread 40. A virtual thread 40 in the active state 35 may switch to inactive state 37 when it is complete and a virtual thread 40 in the inactive state 37 may switch to the active state 35 upon a request 22 from the application program described above.

While an embodiment showing the use of a virtualizer program interposed between the application programs and operating system is disclosed, it will be appreciated that the functionality of the virtualizer program 20 may be incorporated into the operating system 16, thereby allowing some elimination of duplicated mechanisms (for example, separate mapping processes). It will be equally recognized that different functional elements of the virtualizer program and the operating system may be freely allocated between these programs and that features of the virtualizer program may be implemented in other programs such as a runtime program or even by the application programs themselves and accordingly the claim should not be considered limited, except to the extent expressly indicated, to a particular allocation of functions among programs.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a computer system" can be understood to include one or more processors or cores that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

"Application program" as used herein generally refers to any program executable on one or more cores (including possibly an operating system) and may include as context requires the program runtime, various linked libraries, and drivers. It will be appreciated that $P_{optimum}$ necessarily only approximates an optimum value and that this terminology should not be considered limiting.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. An electronic computer system comprising:
   at least two electronic processors executing programs stored in non-transitory medium, at least one processor to:
   (a) provide to an application program a number of virtual threads for execution;
   (b) during a preceding interval of execution of the application program, vary a number of actual threads executed by the at least one processor, the actual threads selected from the number of virtual threads and the number of actual threads being a subset of the virtual threads and less than the number of virtual threads while evaluating the application program performance to establish a relationship between the number of actual threads and the number of virtual threads and the application program performance;
   (c) during a succeeding interval of execution following the preceding interval of execution, control the number of actual threads employed by the application program based on the relationship to improve the application program performance; and
   (d) repeat steps (b) and (c) during execution of the application program at successive preceding and succeeding intervals of execution while changing which virtual threads are selected as active threads independently of varying the number of actual threads;
   wherein each virtual thread is associated with independent state storage for holding a state of the virtual thread.

2. The electronic computer system of claim 1 wherein the application program performance is that of instruction execution speed.

3. The electronic computer system of claim 1 wherein the application program performance is that of processor resource usage.

4. The electronic computer system of claim 1, wherein the application program performance is that of processor energy or power usage.

5. The electronic computer system of claim 1 wherein at least one processor determines when a parallelism region of the application program occurs in which instructions of the application program may be executed in parallel, and wherein step (a) is timed to occur in the parallelism region of the application program.

6. The electronic computer system of claim 5 wherein the relationship measures an apparent artificial serialization of the application program representing a decrease in application program performance below that possible when instructions of the application program which may be executed in parallel are executed in parallel.

7. The electronic computer system of claim 1 including the step of monitoring a parameter of application program performance and wherein step (d) repeats steps (b) and (c) based on changes in the monitored parameter occurring during the succeeding interval.

8. The electronic computer system of claim 7 wherein the parameter of application program performance is selected from the group consisting of executed instructions per second, processor power, processor energy and processor temperature.

9. The electronic computer system of claim 1 including the step of monitoring time and wherein step (d) repeats steps (b) and (c) based on expiration of a predetermined time after a previous performance of steps (b) and steps (c).

10. The electronic computer system of claim 1 wherein step (c) is performed by providing a virtualizing program positioned between the application program and an operating system program, the operating system program allocating N threads to the application program, the N threads independently schedulable on the electronic processors and independently executable on different electronic processors;

and wherein the virtualizing program communicates with the application program to provide the application program with M virtual threads and to map a changing subset P of the N threads to the virtual threads M based on the relationship to improve the application program performance.

11. The electronic computer system of claim 10 wherein the application program varies a mapping of the P threads to all of the M virtual threads by activating and suspending the M virtual threads over time to guarantee forward progress.

12. The electronic computer system of claim 10 further including a call stack associated with each of the M virtual threads allowing activating and suspending of the virtual threads.

13. The electronic computer system of claim 1 wherein the independent state storage allows the virtual thread to be activated for execution as an actual thread and suspended without execution without loss of execution state.

14. The electronic computer system of claim 1 wherein virtual threads are given priority for activation when their execution satisfies a barrier condition.

15. A method of operating an electronic computer system with at least two electronic processors executing programs comprising the steps of:
(a) provide to an application program a number of virtual threads for execution;
(b) during a preceding interval of execution of the application program, varying a number of actual threads executed by the at least one processor the actual threads selected from the number of virtual threads and the number of actual threads being a subset of the first number of virtual threads less than the number of virtual threads while evaluating the application program performance to establish a relationship between the number of actual threads and the number of virtual threads and the application program performance;
(c) during a succeeding interval of execution following the preceding interval of execution, controlling the number of actual threads employed by the application program based on the relationship to improve the application program performance; and
(d) repeating steps (b) and (c) during execution of the application program at successive preceding and succeeding intervals of execution while changing which virtual threads are selected as active threads independently of varying the number of actual threads;
wherein each virtual thread is associated with independent state storage for holding a state of the virtual thread.

16. The method of claim 12 wherein the application program performance is that of instruction execution speed.

17. The method of claim 12 wherein the application program performance is that of processor resource usage.

18. The method of claim 12 wherein the application program performance is that of processor energy or power usage.

19. The method of claim 12 wherein at least one processor determines when a parallelism region of the application program occurs in which instructions of the application program may be executed in parallel, and wherein step (b) is timed to occur in the parallelism region of the application program.

20. The method of claim 18 wherein the relationship measures an apparent artificial serialization of the application program occurring during the parallelism region representing a decrease in application program performance below that possible when instructions of the application program which may be executed in parallel are executed in parallel.

21. The method of claim 12 including the step of monitoring a parameter of application program performance and wherein step (d) repeats steps (b) and (c) based on changes in the monitored parameter occurring during the succeeding interval.

22. The method of claim 12 wherein step (c) is performed by providing a virtualizing program positioned between the application program and an operating system program, the operating system program allocating N threads to the application program, the N threads independently schedulable on the electronic processors and independently executable on different electronic processors;

and wherein the virtualizing program communicates with the application program to vary a fraction of the N threads available to the application program based on the relationship to improve the application program performance.

* * * * *